Figure 1:
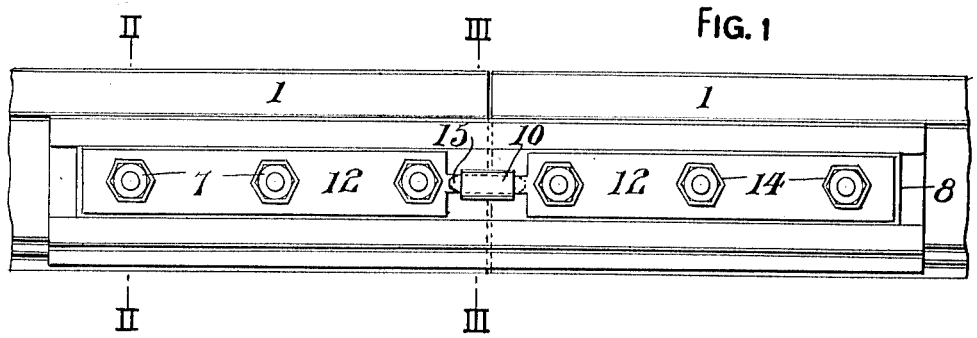

S. W. CARPENTER.
NUT LOCKING DEVICE.
APPLICATION FILED OCT. 2, 1911.

1,063,853.

Patented June 3, 1913.

WITNESSES
J. P. Appleman,
Ralph C. Evert.

INVENTOR
Samuel W. Carpenter
BY
ATTORNEYS

UNITED STATES PATENT OFFICE.

SAMUEL W. CARPENTER, OF PITTSBURGH, PENNSYLVANIA.

NUT-LOCKING DEVICE.

1,063,853.  Specification of Letters Patent.  Patented June 3, 1913.

Application filed October 2, 1911. Serial No. 652,285.

*To all whom it may concern:*

Be it known that I, SAMUEL W. CARPENTER, a citizen of the United States of America, residing at Pittsburgh, in the county of Allegheny and State of Pennsylvania, have invented certain new and useful Improvements in Nut-Locking Devices, of which the following is a specification, reference being had therein to the accompanying drawing.

This invention relates to nut locking devices especially designed for rail joints or structures having a plurality of bolts and nuts that are arranged in a row.

The primary object of my invention is to provide simple and effective means for preventing nuts from becoming accidentally displaced relatively to bolts due to the vibrations of the structures in which the bolts are mounted.

I attain the above objects by a mechanical construction that will be hereinafter specifically described and then claimed, and reference will now be had to the drawing, wherein like numerals denote corresponding parts throughout the several views, in which:—

Figure 2:
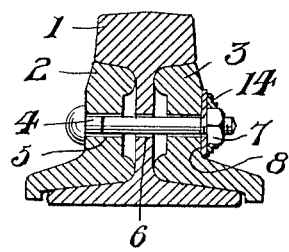
Figure 3:
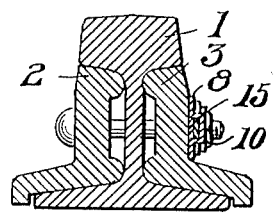
Figure 4:
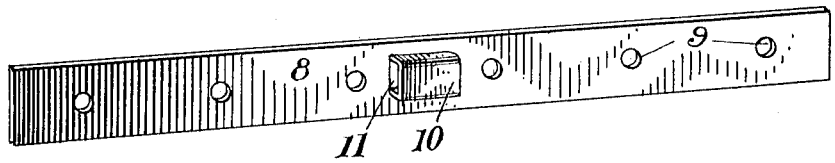
Figure 5:
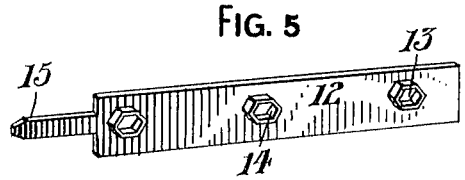

Figure 1 is a side elevation of a rail joint provided with the nut locking members, Fig. 2 is a cross sectional view taken on the line II—II of Fig. 1, Fig. 3 is a similar view taken on the line III—III of Fig. 1, Fig. 4 is a perspective view of the combined coupling plate and washer forming a part of the nut locking device, and Fig. 5 is a perspective view of one of the nut locking members.

The reference numeral 1 denotes rails having the confronting ends thereof braced by splice bars 2 and 3 and these bars are held in engagement with the rails 1 by a plurality of bolts 4 extending through openings 5 and 6 provided therefor in the bars and rail. The threaded ends of the bolts 4 protrude from the outer side of the splice bar 3 and are adapted to receive nuts 7. Prior to mounting the nuts upon the bolts 4, an oblong base plate 8 is placed upon said bolts, said plate having openings 9 to provide clearance for the threaded ends of the bolts. The base plate 8, intermediate the ends thereof, is stamped or pressed to provide a strap or housing 10 that extends outwardly from the outer side of the base plate 8. The strap or housing 10 has open ends in a line with the openings 9 of the plate 8. After the plate 8 has been placed upon the bolts against the splice bar 3, the nuts 7 are screwed upon the bolts and tightened against the plates 8. It is then that oblong locking members 12 are placed upon the nuts 7, said members having openings 13 to receive the nuts 7 and surrounding said openings are casings 14 that inclose the facets of the nuts 7, thus preventing said nuts from rotating. The confronting ends of the members 12 are provided with malleable tongues 15 and these tongues are placed in the strap or housing 10 said tongues overlapping as best shown in Figs. 1 and 3 and said tongues in connection with said housing 10 connect the locking members to the plate 8 so as to prevent the locking members from becoming accidentally displaced by providing two locking members, if one of the bolts at one side of the joint should become damaged it only necessitates the removal of one of the locking members. It is preferable to punch and stamp the members 12 to provide the casings 14, and these casings can be hexagon or rectangular in cross section to accommodate hexagon or rectangular nuts.

With the bolts 4 held from rotation in the splice bar 2 in the ordinary and well known manner, it is impossible for the bolts to rotate and as the nuts are prevented from rotating by the casings 14, it is obvious that the rail joint will remain intact even though subjected to vibrations.

While in the drawing there is illustrated a preferred embodiment of my invention, it is to be understood that the structural elements thereof are susceptible to such changes as fall within the scope of the appended claims.

What I claim is:—

Means for locking a plurality of nuts disposed in the same plane, comprising a base plate provided with bolt openings and having an open ended keeper located mid-way the ends of the plate and projecting from the outer face of the latter, combined with a pair of nut-securing plates disposed in the same plane and provided at their adjacent ends with tongues extending into the open
5 ended keeper from opposite directions and in overlapping relation, and nut-housings on the outer faces of said securing plates.

In testimony whereof I affix my signature in the presence of two witnesses.

SAMUEL W. CARPENTER.

Witnesses:
MAX H. SROLOVITZ,
CHRISTINA T. HOOD.